United States Patent
Washino (10) Patent No.: US 9,086,135 B2
(45) Date of Patent: Jul. 21, 2015

(54) ENGINE CONTROL APPARATUS

(71) Applicant: NHK SPRING CO., LTD., Yokohama-shi, Kanagawa (JP)

(72) Inventor: Keishi Washino, Yokohama (JP)

(73) Assignee: NHK SPRING CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/452,083

(22) Filed: Aug. 5, 2014

(65) Prior Publication Data
US 2015/0033897 A1  Feb. 5, 2015

(30) Foreign Application Priority Data
Aug. 5, 2013  (JP) ................. 2013-162805

(51) Int. Cl.
*F16H 59/10* (2006.01)
*F16H 59/02* (2006.01)
*B63H 21/21* (2006.01)

(52) U.S. Cl.
CPC ............ *F16H 59/10* (2013.01); *F16H 59/0278* (2013.01); *B63H 21/213* (2013.01)

(58) Field of Classification Search
CPC ... B63H 21/213; F16H 59/0278; F16H 59/10; Y10T 74/20006; Y10T 74/2001; Y10T 74/20018; Y10T 74/20043; Y10T 74/20049; Y10T 74/20055; Y10T 74/200061; Y10T 74/20073; Y10T 74/2011; Y10T 74/20232; Y10T 74/20268; Y10T 74/20274; Y10T 74/20287; Y10T 74/19251; Y10T 74/19256
USPC ........................ 74/335, 471 R–473.37, 480 B; 440/84–87; 477/107–113, 70–96, 165
See application file for complete search history.

(56) References Cited

U.S. PATENT DOCUMENTS

| | | | | |
|---|---|---|---|---|
| 2,588,650 | A * | 3/1952 | Morse | 477/112 |
| 2,909,146 | A * | 10/1959 | Strang | 440/85 |
| 2,933,943 | A * | 4/1960 | Buddo et al. | 74/471 R |
| 3,083,587 | A * | 4/1963 | Buddo | 74/471 R |
| 3,640,155 | A * | 2/1972 | Waner et al. | 477/112 |
| 3,741,045 | A * | 6/1973 | Kobayashi | 477/113 |
| 3,874,321 | A * | 4/1975 | Smith | 440/42 |
| 4,632,232 | A * | 12/1986 | Kolb et al. | 477/112 |
| 4,898,045 | A * | 2/1990 | Baba | 74/471 R |
| 4,920,819 | A * | 5/1990 | Uchida et al. | 74/480 B |
| 5,216,934 | A * | 6/1993 | Iwasaki | 74/501.6 |
| 5,352,138 | A * | 10/1994 | Kanno | 440/1 |
| 5,492,493 | A * | 2/1996 | Ohkita | 440/86 |
| 6,866,022 | B1 * | 3/2005 | Phillips et al. | 123/400 |

FOREIGN PATENT DOCUMENTS

JP           03035505 B2    5/1991

* cited by examiner

*Primary Examiner* — William Kelleher
*Assistant Examiner* — Valentin Craciun
(74) *Attorney, Agent, or Firm* — Holtz, Holtz, Goodman & Chick PC (57) ABSTRACT

A shift drive unit includes a shift drive gear, and a shift arm which meshes with the shift drive gear. A throttle drive unit includes a throttle drive gear, a slide member, and a throttle arm. When a control lever is pivoted in a shift operation range, rotation of the shift drive gear is transmitted to the shift arm. When the control lever is pivoted in a throttle operation range, rotation of the throttle drive gear is transmitted to the throttle arm via the slide member, and a throttle cable is thereby operated. A friction mechanism includes a brake shoe and a disc spring unit. When the control lever is pivoted in the throttle operation range, the brake shoe contacts a brake portion.

5 Claims, 9 Drawing Sheets

FIG. 13 ing ENGINE CONTROL APPARATUS

CROSS-REFERENCE TO RELATED APPLICATIONS

This application is based upon and claims the benefit of priority from prior Japanese Patent Application No. 2013-162805, filed Aug. 5, 2013, the entire contents of which are incorporated herein by reference.

BACKGROUND OF THE INVENTION

1. Field of the Invention

This invention relates to an engine control apparatus for performing a gear-shift operation and a throttle operation of an engine of a boat, for example, by way of a single control lever.

2. Description of the Related Art

Engine control apparatuses which are capable of performing a gear-shift operation (shift operation) and a throttle operation of an engine of a boat by way of a single control lever are known. As described in Jpn. Pat. Appln. KOKOKU Publication No. 3-35505 (Patent Document 1), for example, a control apparatus having a shift drive unit and a throttle drive unit accommodated in a single housing is publicly known. In such a control apparatus, a control lever is pivoted by a predetermined amount to a forward position (an ahead position) or a reverse position (an astern position) from the neutral position. Then, via a Geneva gear mechanism interlocked with the control lever, a shift cable is moved to the forward position or the reverse position. When the control lever is further pivoted, the control lever enters into a throttle operation range. In the throttle operation range, as a cam member moves in accordance with the position of the control lever, a throttle cable moves in accordance with a position of a cam follower.

In this type of engine control apparatus, a friction mechanism for producing a certain degree of frictional force to be applied to the control lever is provided for preventing the control lever from inadvertently moving when it is in the throttle operation range. For example, in the control apparatus of Patent Document 1, by pressing a brake shoe against an inner surface of a brake chamber of a housing body, a frictional force is produced and applied to the control lever.

A single lever type control apparatus of Patent Document 1 has a long track record of being used as an engine control apparatus for a boat. However, the throttle drive unit of Patent Document 1 is configured such that an operation of the control lever is transmitted to the throttle cable via the cam member. Accordingly, transmission efficiency of force is sometimes relatively low depending on the relative position of the cam member and the cam follower. In such a case, a large force of operation is required. Also, the conventional engine control apparatus has room for improvement to deal with situations such as a frictional force being suddenly reduced when the brake shoe is worn out.

BRIEF SUMMARY OF THE INVENTION

Accordingly, an object of this invention is to provide an engine control apparatus capable of further improving operability of a control lever, and producing and applying a stable frictional force to the control lever in a throttle operation range where necessary.

The engine control apparatus according to an embodiment comprises a housing, a drive shaft provided rotatably in the housing, a control lever, a shift drive unit, a throttle drive unit, and a friction mechanism. The control lever is mounted on the drive shaft and is pivotable over a forward shift operation range, a forward throttle operation range, a reverse shift operation range, and a reverse throttle operation range with the neutral position in between forward and reverse. The shift drive unit moves a shift cable to a forward position when the control lever is moved to the forward shift operation range from the neutral position, and moves the shift cable to a reverse position when the control lever is moved to the reverse shift operation range from the neutral position. The throttle drive unit transmits pivoting of the control lever to a throttle cable in a state where the control lever is moved to the forward throttle operation range or the reverse throttle operation range. The friction mechanism applies friction to pivoting of the control lever in a state where the control lever is moved to the forward throttle operation range or the reverse throttle operation range.

Further, the shift drive unit comprises a shift drive gear and a shift arm. The shift drive gear includes a driving side gear portion which rotates together with the drive shaft. The shift arm includes a driven side gear portion which transmits pivoting of the shift drive gear by meshing with the driving side gear portion when the control lever is in the shift operation range. The shift arm is brought into a stopped state when the control lever pivots in the throttle operation range exceeding the shift operation range.

The throttle drive unit comprises a throttle drive gear, a slide member which moves by rotation of the throttle drive gear, and a throttle arm connected to the slide member. The throttle drive gear rotates in a first direction and a second direction from the initial position. The slide member comprises a first rack gear which meshes with the throttle drive gear when the control lever is in the forward throttle operation range, and a second rack gear which meshes with the throttle drive gear when the control lever is in the reverse throttle operation range.

According to the embodiment configured as such, a force of operation can be reduced as compared to a control apparatus having a throttle drive unit which uses a conventional cam member, and a stable frictional force can also be produced and applied to the control lever in the throttle operation range where necessary.

An example of the friction mechanism comprises a brake portion, a brake shoe arranged to be opposed to the brake portion, a spring member which urges the brake shoe toward the brake portion, and supporting means (for example, a step portion provided in the housing). The brake portion is provided in the shift drive gear and rotates together with the shift drive gear. The supporting means supports the brake shoe when the control lever is in the forward or the reverse shift operation range. The brake portion comprises a non-friction surface and a friction surface. The non-friction surface is separated from the brake shoe while the brake shoe is being supported by the supporting means when the control lever is moved to the forward shift operation range or the reverse shift operation range from the neutral position. The friction surface contacts the brake shoe in a state where the control lever is pivoted to the forward throttle operation range or the reverse throttle operation range. An example of the spring member is constituted of a disc spring unit formed by stacking a plurality of disc springs so that they are arranged in series. Also, the spring member may comprise an adjuster screw which adjusts the amount of deflection of the disc spring unit.

An example of the throttle drive unit comprises a stopper pin provided in the slide member, and supporting portions. The supporting portions prevent movement of the slide member by engaging with the stopper pin when the control lever is moved to the forward shift operation range or the reverse shift operation range from the neutral position, and allow movement of the slide member as they are released from the stopper pin in a state where the throttle drive gear is rotated by a predetermined amount in the first direction or the second direction from the initial position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An engine control apparatus 10 according to an embodiment will be described with reference to FIGS. 1 to 13.

Figure 1:
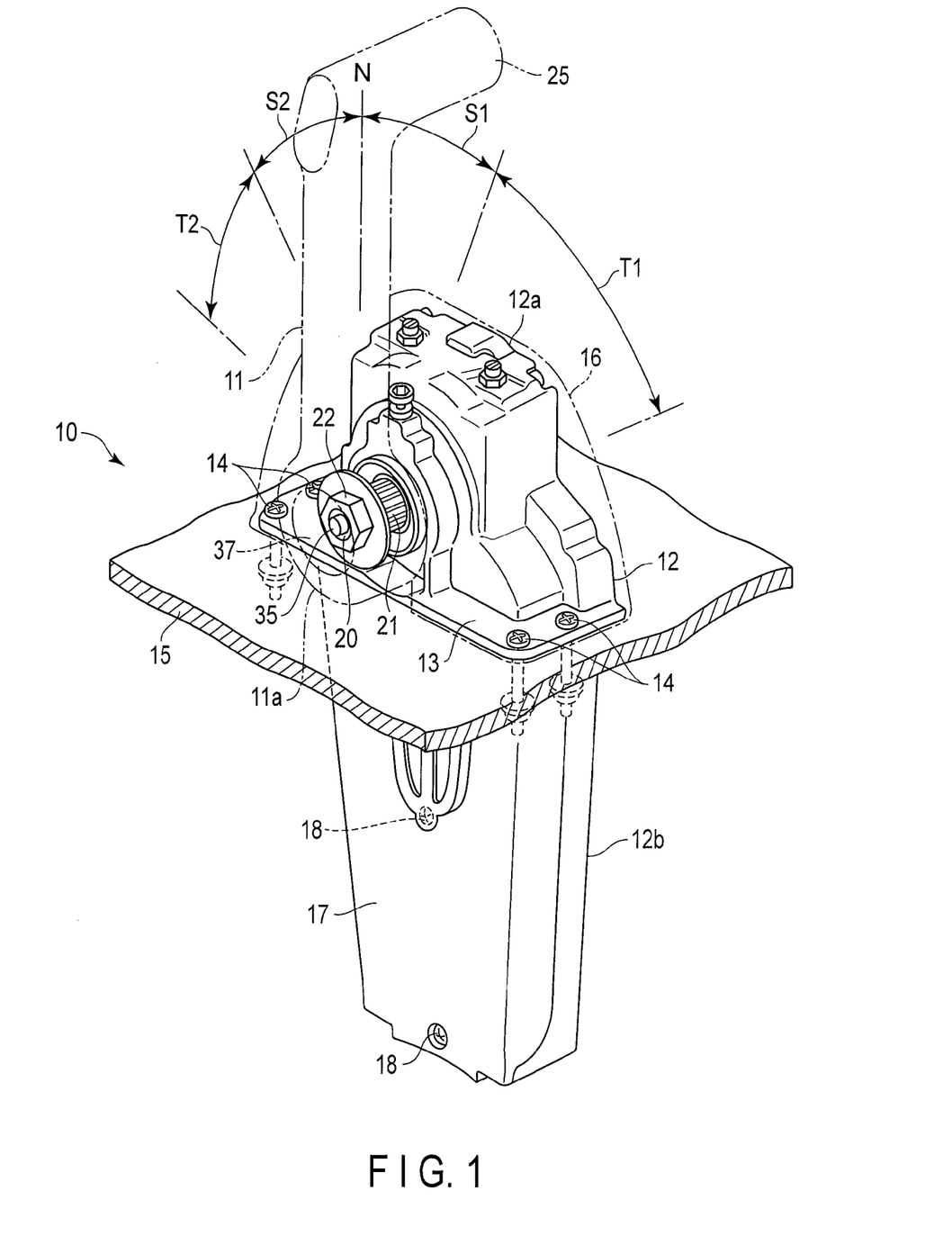
FIG. 1 is a perspective view of an engine control apparatus according to an embodiment.

FIG. 1 illustrates the engine control apparatus 10 for a boat. The engine control apparatus 10 has the function of performing a shift operation (gear-shift operation) for forward motion and reverse motion of an engine such as an outboard motor, and a throttle operation for controlling a throttle opening of the engine by remote control by way of a single control lever 11.

The engine control apparatus 10 comprises a housing 12 made of rust-resistant metal such as an aluminum alloy. A flange 13 is provided on the housing 12. The flange 13 is secured to a hull member 15 by a fixing member 14, such as a bolt. An upper part 12a of the housing 12 projects outwardly from the hull member 15, and is covered by a top cover 16.

A lower part 12b of the housing 12 is accommodated within the hull member 15. One of side surfaces of the lower part 12b of the housing 12 (the left side surface in FIG. 1) is opened, and this opening is covered by a side cover 17 made of a synthetic resin. The side cover 17 is secured to the housing 12 by a fixing member 18, such as a bolt.

On the upper part 12a of the housing 12, a drive shaft 20 is provided such that it is rotatably movable. The drive shaft 20 extends horizontally. At an end portion of the drive shaft 20 which is located outside the housing 12, a spline portion 21 is formed. A base portion 11a of the control lever 11 is secured to the spline portion 21 by a nut 22.

The control lever 11 can be pivoted about the drive shaft 20. At a distal end of the control lever 11, a handle portion 25 in the form of allowing a vessel operator to grip it by hand is provided. The control lever 11 as shown in FIG. 1 can be pivoted over shift operation range S1 and throttle operation range T1 of the forward side and shift operation range S2 and throttle operation range T2 of the reverse side with neutral position N in between.

Figure 2:
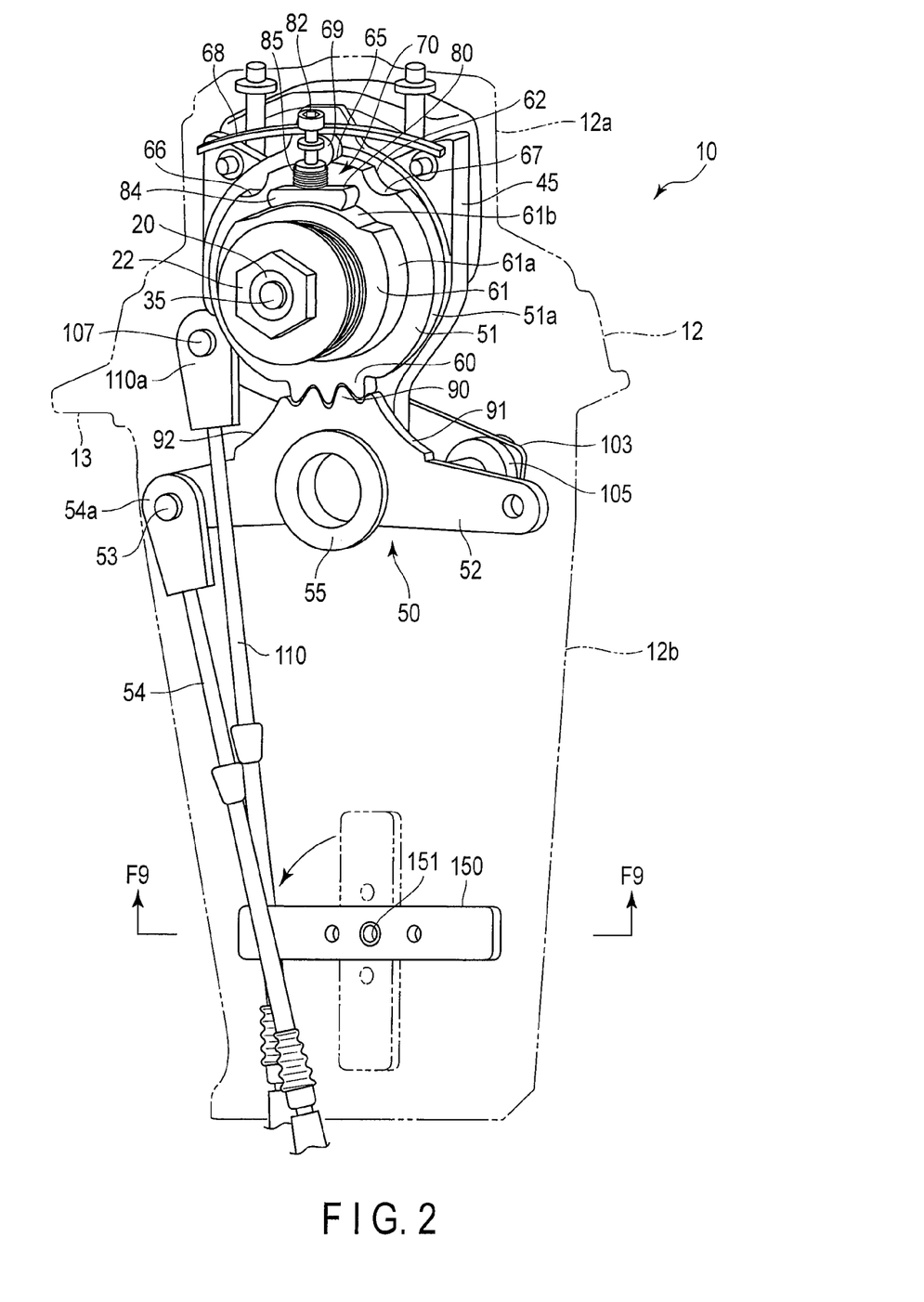
FIG. 2 is a perspective view of the interior of the engine control apparatus shown in FIG. 1.
Figure 3:
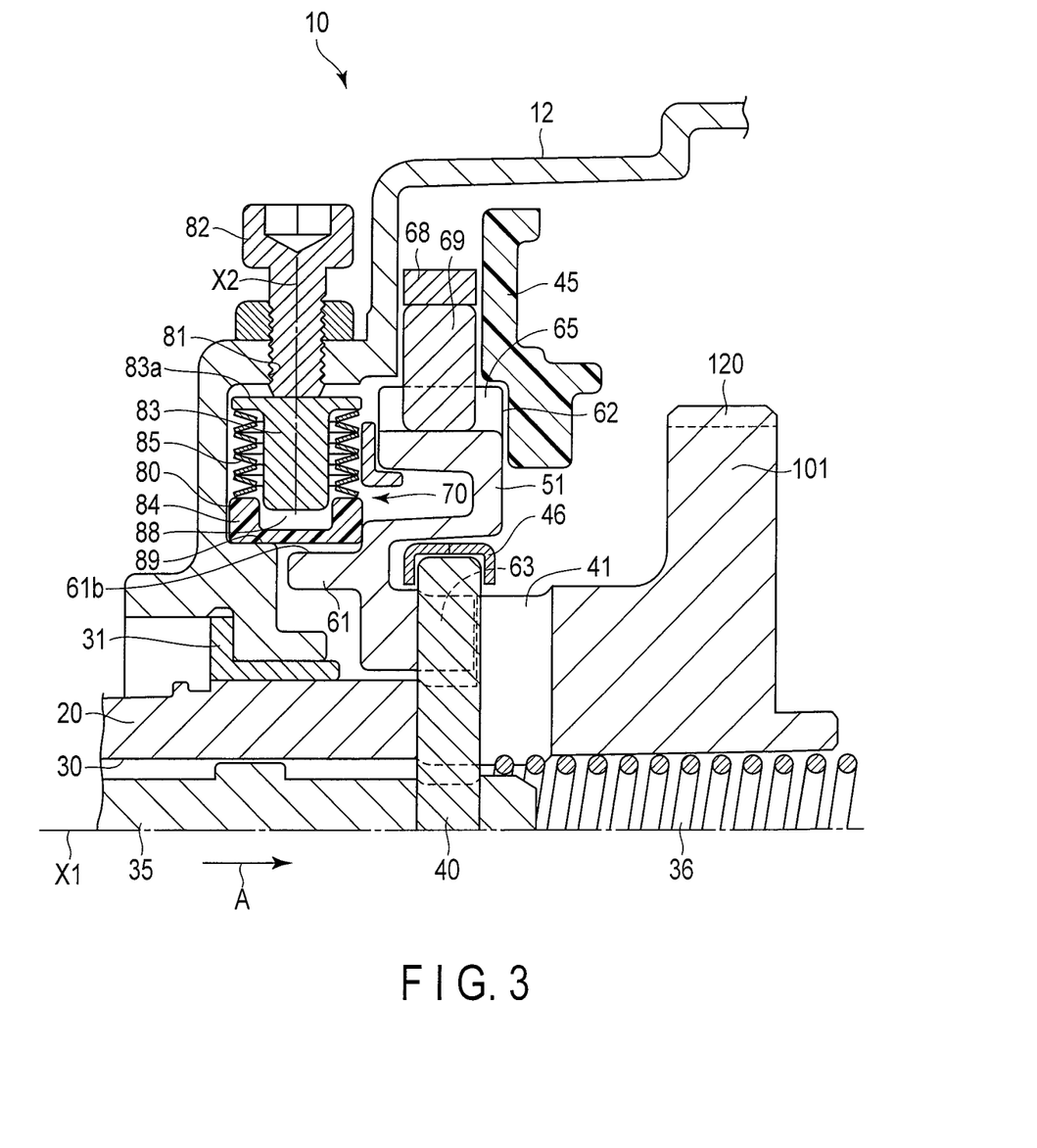
FIG. 3 is a partial cross-sectional view of the engine control apparatus shown in FIG. 1 when a control lever is in the neutral position.
Figure 4:
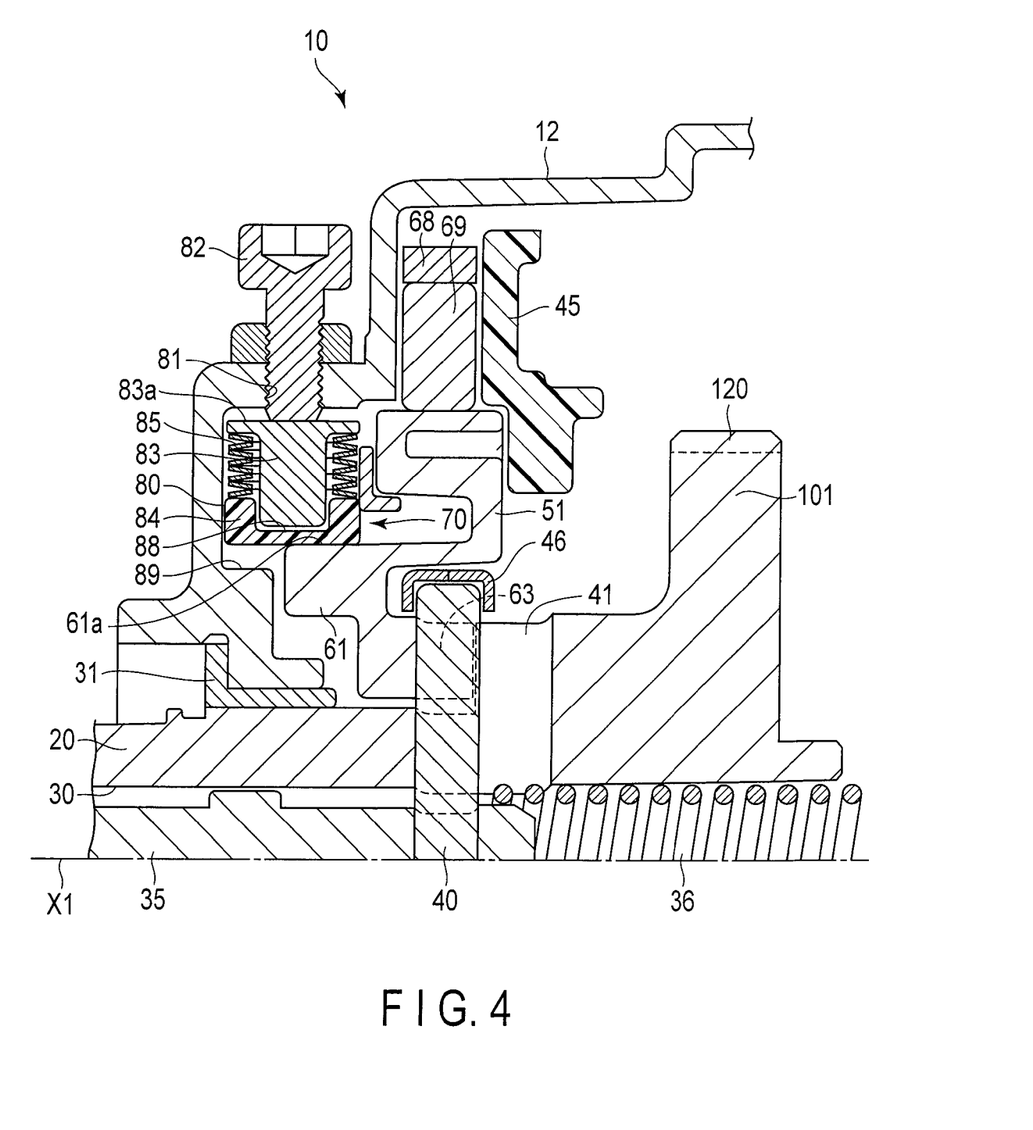
FIG. 4 is a partial cross-sectional view of the engine control apparatus of FIG. 3 when the control lever is moved to a throttle operation range.
Figure 5:
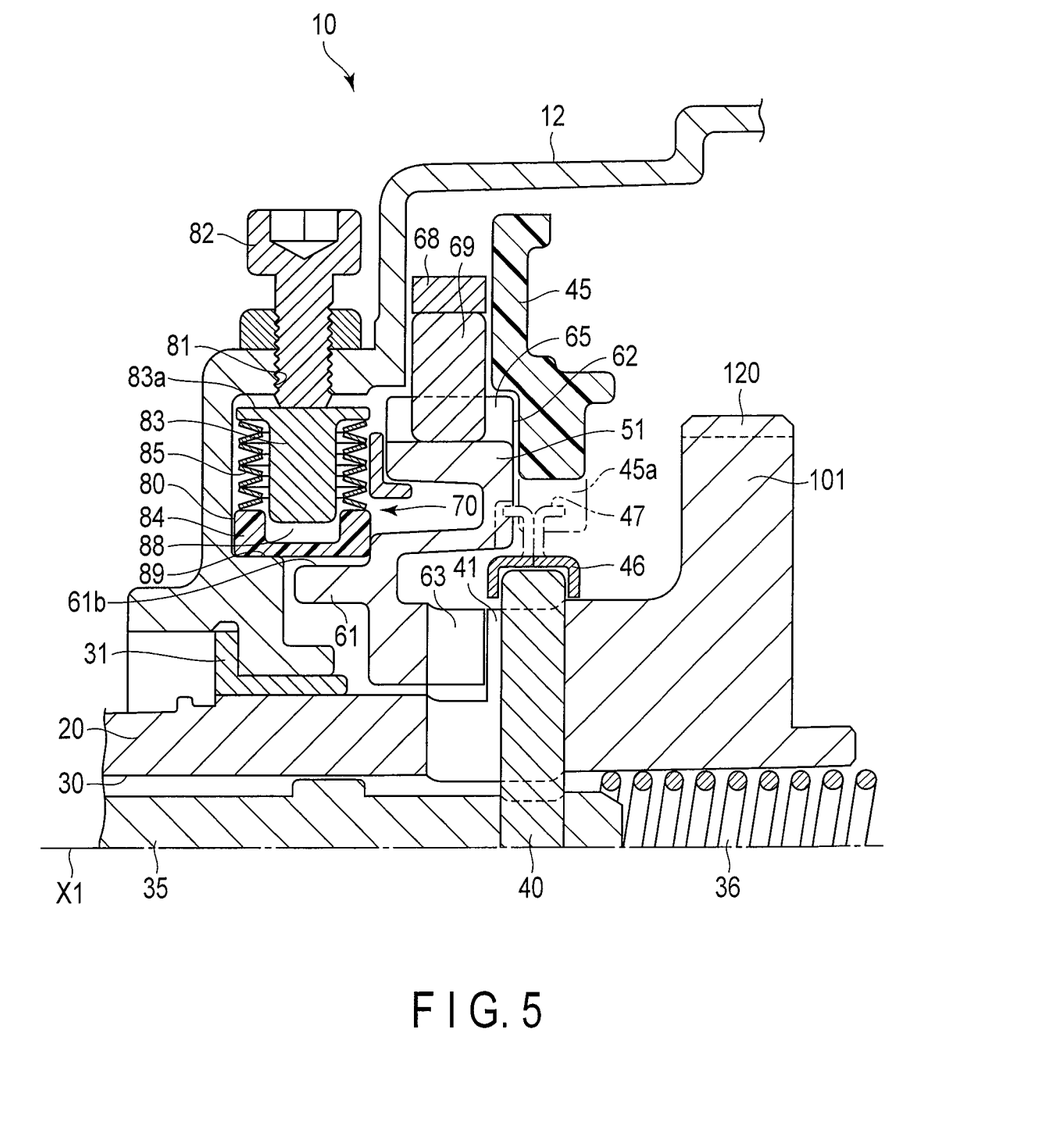
FIG. 5 is a partial cross-sectional view of the engine control apparatus of FIG. 3 in a state where a clutch pin is moved.
Figure 6:
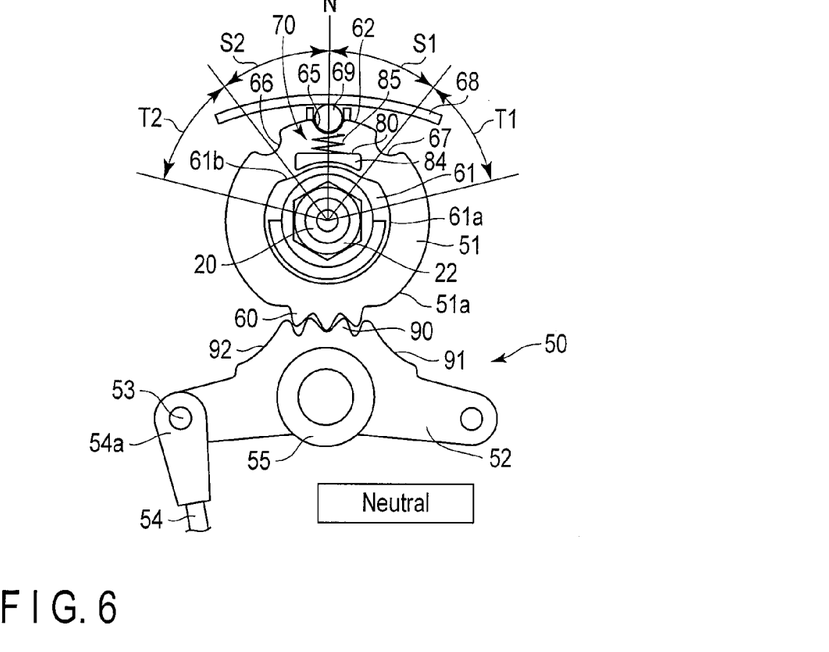
FIG. 6 is a front view of a shift drive unit when the control lever is in the neutral position.

FIG. 2 illustrates the interior of the engine control apparatus 10. FIGS. 3 to 5 are cross-sectional views showing the interior of a portion near the upper part 12a of the housing 12. The drive shaft 20 is inserted into a through-hole 30 formed in the housing 12. The drive shaft 20 is rotatably supported relative to the housing 12 by a bearing member 31. The drive shaft 20 rotates together with the control lever 11. The drive shaft 20 can be pivoted over shift operation range S1 and throttle operation range T1 of the forward side and shift operation range S2 and throttle operation range T2 of the reverse side with neutral position N in between as shown in FIG. 6, in accordance with an operation angle of the control lever 11.

As shown in FIGS. 3 to 5, the drive shaft 20 is hollow and a pushrod 35 is inserted into the drive shaft 20. The pushrod 35 can be moved relative to the drive shaft 20 in the direction of axial line X1. The pushrod 35 is urged in a direction of protruding from the drive shaft 20 by a return spring 36 formed of a compression coil spring, for example. On the base portion 11a of the control lever 11, a push operation portion 37 (FIG. 1) is provided. The pushrod 35 can be operated in a direction of compressing the return spring 36 (the direction indicated by arrow A in FIG. 3) by the push operation portion 37.

In the middle of the pushrod 35 in a longitudinal direction thereof, a clutch pin 40 is provided. The clutch pin 40 extends in a radial direction of the drive shaft 20 (i.e., a direction orthogonal to axial line X1). The clutch pin 40 is inserted into a long hole 41 formed in the middle of the drive shaft 20 in the longitudinal direction thereof. The clutch pin 40 inserted into the long hole 41 is prevented from being relatively rotated with respect to the drive shaft 20 about axial line X1. Accordingly, the clutch pin 40 rotates about axial line X1 together with the drive shaft 20.

Further, the clutch pin 40 can be moved in a longitudinal direction of the long hole 41 (i.e., a direction along axial line X1). The clutch pin 40 is movable between a first position as shown in FIGS. 3 and 4 and a second position as shown in FIG. 5 in the direction of axial line X1 of the drive shaft 20 within the range of a length of the long hole 41.

As shown in FIGS. 3 to 5, a gear case 45 is provided inside the housing 12. The gear case 45 is secured to the housing 12. In the interior of the gear case 45, a guide ring 46 that is positioned concentrically with the drive shaft 20 is provided. The guide ring 46 is contiguous along a circumferential direction of the drive shaft 20.

Both ends of the clutch pin 40 (yet only one of them is shown in FIGS. 3 to 5) are fitted to the guide ring 46. Both ends of the clutch pin 40 can be moved in the circumferential direction of the guide ring 46 along guide ring 46. As shown in FIG. 5, a protrusion 47 is formed at a part of the guide ring 46 in the circumferential direction thereof. In a state where the clutch pin 40 is moved to the second position shown in FIG. 5, the protrusion 47 is engaged with a portion 45a, which is a part of the gear case 45, and a shift drive gear 51 which will be described later.

Figure 7:
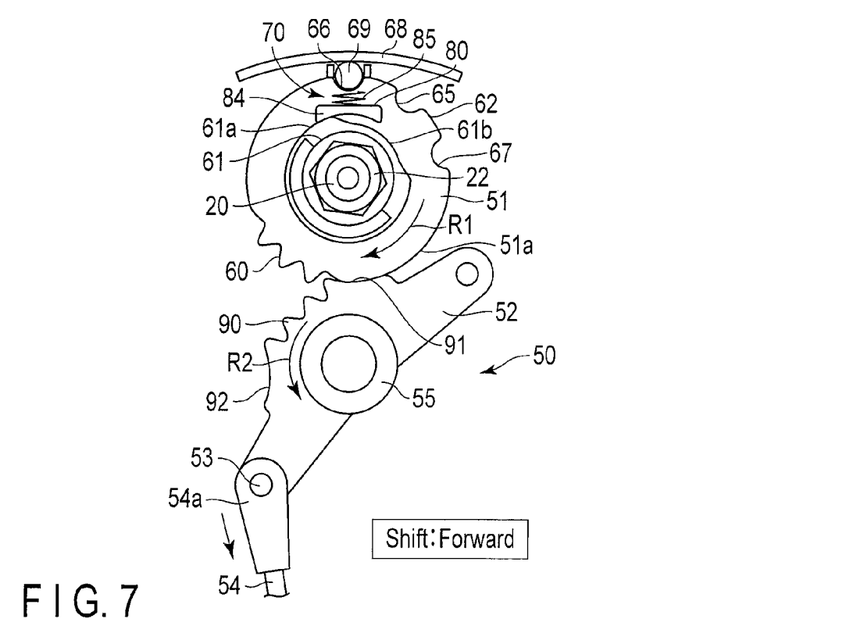
FIG. 7 is a front view showing a state where the shift drive unit is moved to a forward position.
Figure 8:
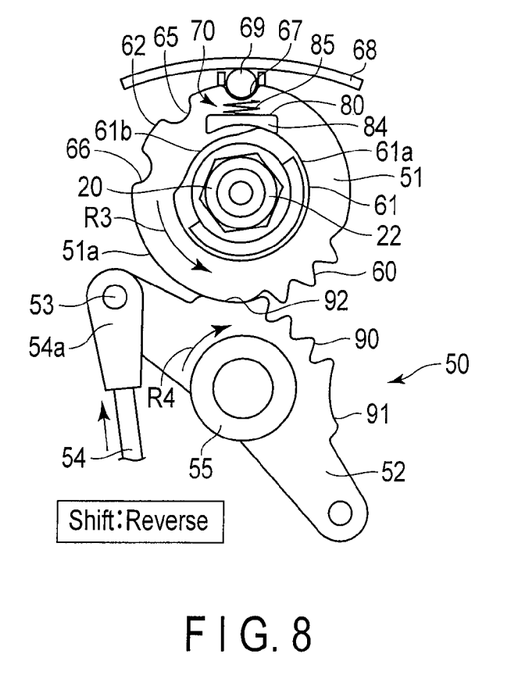
FIG. 8 is a front view showing a state where the shift drive unit is moved to a reverse position.

FIGS. 6 to 8 illustrate a shift drive unit 50. The shift drive unit 50 includes the shift drive gear 51 and a shift arm 52. While an example of the material of the shift drive gear 51 is aluminum alloy, and an example of the material of the shift arm 52 is zinc alloy, a high-strength wear-resistant synthetic resin may be used for the aforementioned materials. End portion 54a of a shift cable (push-pull cable) 54 is connected to a connection portion 53 provided at an end of the shift arm 52. Another end of the shift cable 54 is connected to a shift mechanism of the engine. When the end portion 54a of the cable 54 is to be mounted to the connection portion 53 of the shift arm 52, the side cover 17 is removed from the housing 12. Then, the end portion 54a of the cable 54 is fitted in the connection portion 53 of the shift arm 52 from the side. After that, the side cover 17 is secured to the housing 12 by the fixing member 18.

Figure 9:
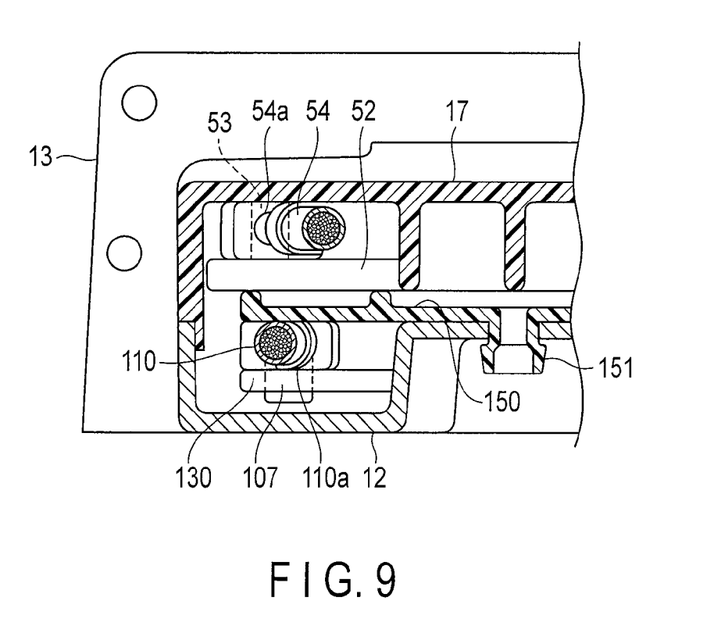
FIG. 9 is a transverse sectional view of a part of the engine control apparatus taken along line F9-F9 of FIG. 2.

As shown in FIG. 9, the shift cable 54 is pressed from the side by the side cover 17 in a state where the side cover 17 is closed. Accordingly, the end portion 54a of the shift cable 54 connected to the connection portion 53 can be prevented from slipping out by the side cover 17 without using a retaining member such as an E-ring.

The shift arm 52 pivots about a shaft part 55. The shaft part 55 is supported by the housing 12. FIG. 6 illustrates a state in which the shift drive gear 51 is stopped at the neutral position. FIG. 7 illustrates a state in which the shift drive gear 51 is rotated to a forward position from the neutral position. FIG. 8 illustrates a state in which the shift drive gear 51 is rotated to a reverse position from the neutral position. The shift arm 52 pivots about the shaft part 55 between the forward position shown in FIG. 7 and the reverse position shown in FIG. 8 from the neutral position shown in FIG. 6.

The shift drive gear 51 is provided to be relatively rotatable with respect to the drive shaft 20 about axial line X1. When the clutch pin 40 is at the first position shown in FIGS. 3 and 4, the shift drive gear 51 rotates together with the drive shaft 20. When the clutch pin 40 is moved to the second position shown in FIG. 5, the shift drive gear 51 is disengaged from the drive shaft 20. In this disengaged state, the shift drive gear 51 does not rotate relative to the housing 12. The protrusion 47 (FIG. 5) is formed on the guide ring 46. In the state where the clutch pin 40 is moved to the second position, the protrusion 47 is engaged with both of the gear case 45 and the shift drive gear 51.

The shift drive gear 51 comprises a driving side gear portion 60 formed at a part of the gear 51 in a circumferential direction thereof, a brake portion 61 having a disc-like shape, a detent portion 62, and a pin engagement portion 63 (FIGS. 3 to 5). The pin engagement portion 63 has the form which can engage with the clutch pin 40. The shift drive gear 51 rotates together with the drive shaft 20. Accordingly, the driving side gear portion 60, the brake portion 61, the detent portion 62, and the pin engagement portion 63 rotate together with the drive shaft 20. The detent portion 62 comprises a first recess 65, a second recess 66, and a third recess 67. At the interior of the housing 12, a detent member 69 is arranged. An example of the detent member 69 is constituted of a rolling element such as a roller or a ball which is urged by spring 68.

When the shift drive gear 51 is at the neutral position as shown in FIG. 6, the first recess 65 engages with the detent member 69. In this way, the position of the shift drive gear 51 in the rotational direction thereof is restricted. When the control lever 11 is pivotally moved to the border between shift operation range S1 and throttle operation range T1 of the forward side, the second recess 66 engages with the detent member 69, as shown in FIG. 7. In this way, the position of the shift drive gear 51 in the rotational direction thereof is restricted. When the control lever 11 is pivotally moved to the border between shift operation range S2 and throttle operation range T2 of the reverse side, the third recess 67 engages with the detent member 69, as shown in FIG. 8. In this way, the position of the shift drive gear 51 in the rotational direction thereof is restricted.

The brake portion 61 includes a friction surface 61a and a non-friction surface 61b. The friction surface 61a is concentric with the drive shaft 20, and formed in a direction corresponding to the circumferential direction of the drive shaft 20. The non-friction surface 61b is constituted of a depressed portion formed at a part of the brake portion 61 in a circumferential direction thereof. The friction surface 61a and the non-friction surface 61b are contiguous in the circumferential direction of the brake portion 61. The brake portion 61 constitutes a part of a friction mechanism 70. The friction mechanism 70 applies friction to pivoting of the control lever 11 in a state where the control lever 11 is moved to forward throttle operation range T1 or reverse throttle operation range T2.

In the housing 12, at a position corresponding to the brake portion 61, a brake unit 80 which constitutes the friction mechanism 70 is arranged. The brake unit 80 includes an adjuster screw 82, a floating member 83, a brake shoe 84 made of a wear-resistant material, a disc spring unit 85, and the like. The adjuster screw 82 is screwed into a screw hole 81 formed in the housing 12. The Floating member 83 is pressed by the adjuster screw 82. The disc spring unit 85 functions as a spring member for urging the brake shoe 84. The brake shoe 84 is arranged to be opposed to the brake portion 61. The disc spring unit 85 is constituted by stacking a plurality of disc springs so that they are arranged in series, and arranged between a flange 83a of the floating member 83 and the brake shoe 84.

The floating member 83 is pressed toward the brake shoe 84 by the adjuster screw 82. A distal end of the floating member 83 is inserted into a recess 88 which is formed in the brake shoe 84. A gap is formed between a distal end surface of the floating member 83 and a bottom surface of the recess 88. The floating member 83 can be moved relative to the brake shoe 84 in the direction of axial line X2 (FIG. 3) by the gap within the recess 88. A position of the floating member 83 in the direction of axial line X2 can be adjusted by the adjuster screw 82. By adjusting the position of the floating member 83, the amount of deflection of the disc spring unit 85 (that is, a reaction force of the disc spring unit 85) can be varied, and it is also possible to reduce the reaction force of the disc spring unit 85 to zero.

As shown in FIGS. 1 and 6, when the control lever 11 is placed at either neutral position N or shift operation range S1 or S2, the brake shoe 84 faces the non-friction surface 61b of the brake portion 61. That is, the brake shoe 84 is separated from the non-friction surface 61b. In such a state, the brake shoe 84 is supported by a step portion 89 (FIG. 3) of the housing 12. Thus, the brake shoe 84 is prevented from being in contact with the brake portion 61, and substantially no friction is produced. The step portion 89 provided in the housing 12 serves as supporting means for supporting the brake shoe 84 when the control lever 11 is in forward shift operation range S1 or reverse shift operation range S2.

The control lever 11 is pivotally moved to throttle operation range T1 going beyond forward shift operation range S1 (FIGS. 1 and 6). In this case, since the brake shoe 84 contacts the friction surface 61a of the brake portion 61 as shown in FIG. 4, friction is produced in the pivoting of the control lever 11. When the control lever 11 is pivotally moved to throttle operation range T2 going beyond shift operation range S2 of the reverse side, the brake shoe 84 contacts the friction surface 61a in this case as well. Consequently, friction is produced in the rotary motion of the control lever 11.

As shown in FIGS. 6 to 8, the shift arm 52 comprises a driven side gear portion 90 which meshes with the driving side gear portion 60 of the shift drive gear 51, and a pair of arcuate surfaces 91 and 92 formed on both sides of the driven side gear portion 90. The gear portions 60 and 90, the arcuate surfaces 91 and 92, and a circumferential surface 51a of the shift drive gear 51 constitute a Geneva gear mechanism.

When the control lever 11 and the shift drive gear 51 are positioned in forward shift operation range S1, the gear portions 60 and 90 mesh with each other. Thus, when the shift drive gear 51 is rotated in the direction indicated by arrow R1 in FIG. 7, the shift arm 52 rotates in the direction indicated by arrow R2. Accordingly, the shift cable 54 is moved to a forward position.

When the control lever 11 and the shift drive gear 51 are positioned in reverse shift operation range S2, the gear portions 60 and 90 mesh with each other in this case as well. Thus, when the shift drive gear 51 is rotated in the direction indicated by arrow R3 in FIG. 8, the shift arm 52 rotates in the direction indicated by arrow R4. Accordingly, the position of the shift cable 54 is switched to a reverse position.

That is, when the control lever 11 is moved to forward shift operation range S1 from neutral position N, the shift drive unit 50 moves the shift cable 54 to the forward position. Also, when the control lever 11 is moved to reverse shift operation range S2 from neutral position N, the shift drive unit 50 moves the shift cable 54 to the reverse position.

When the control lever 11 is pivotally moved to forward throttle operation range T1, the gear portions 60 and 90 are unmeshed from each other, as shown in FIG. 7, and the arcuate surface 91, which is one of the two arcuate surfaces, contacts the circumferential surface 51a of the shift drive gear 51. Thereby, the shift arm 52 is brought into a state in which the shift arm 52 is stopped at the forward position, and only the shift drive gear 51 rotates.

When the control lever 11 is pivotally moved to reverse throttle operation range T2, the gear portions 60 and 90 are unmeshed from each other, as shown in FIG. 8, and the arcuate surface 92, which is another one of the aforementioned arcuate surfaces, contacts the circumferential surface 51a of the shift drive gear 51. Thus, the shift arm 52 is brought into a state in which the shift arm 52 is stopped at the reverse position, and only the shift drive gear 51 rotates.

The engine control apparatus 10 comprises a throttle drive unit 100 as shown in FIGS. 10 to 13. The throttle drive unit 100 includes a throttle drive gear 101, a slide member 102, and a throttle arm 103. While the throttle drive gear 101 of the present embodiment is integral with the drive shaft 20, as another embodiment, it is possible to combine the throttle drive gear 101 formed separately from the drive shaft 20 with the drive shaft 20.

The throttle arm 103 is pivotable about a shaft part 105. The shaft part 105 is supported by the housing 12. An intermediate portion of the throttle arm 103 in a longitudinal direction thereof is connected to the slide member 102 by a pin 106. On another end of the throttle arm 103, a connection portion 107 is provided. An end portion 110a of a throttle cable (push-pull cable) 110 is connected to the connection portion 107.

Another end of the throttle cable (push-pull cable) 110 is connected to a throttle mechanism of the engine. The throttle arm 103 can be moved toward a throttle operation position shown by two-dot chain lines in FIGS. 11 and 12 from the initial position shown in FIG. 10. When the throttle arm 103 is at the initial position shown in FIG. 10, the throttle cable 110 is also at the initial position, and a throttle opening of the engine becomes minimum. The throttle drive unit 100 transmits pivoting of the control lever 11 to the throttle cable 110 in a state where the control lever 11 is moved to forward throttle operation range T1 or reverse throttle operation range T2.

The throttle drive gear 101 rotates together with the drive shaft 20. That is, the throttle drive gear 101 can be moved in a first direction indicated by arrow R5 in FIG. 11 and a second direction indicated by arrow R6 in FIG. 12. At a part of the throttle drive gear 101 in a circumferential direction thereof, a gear portion 120 and a pair of engagement portions 121 and 122 formed on both sides of the gear portion 120 are provided.

Figure 10:
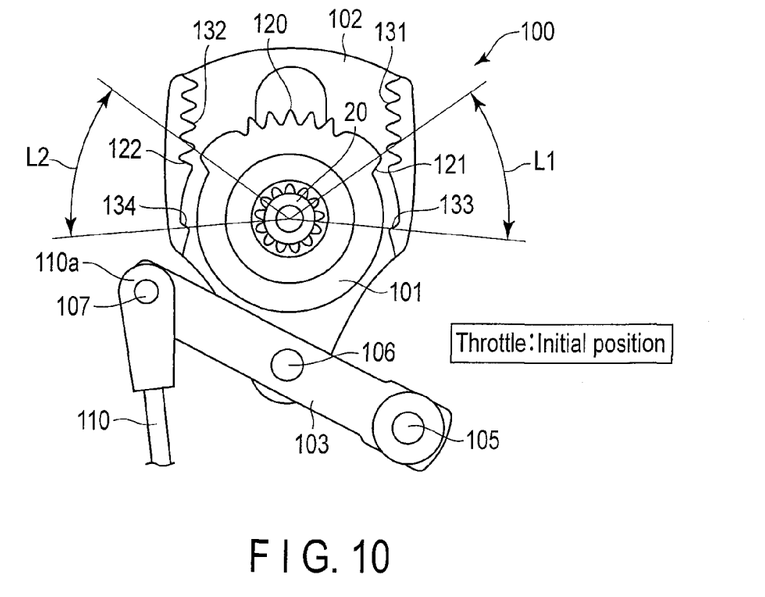
FIG. 10 is a front view of a throttle drive unit of the engine control apparatus when it is in the initial position.

On both sides of the slide member 102, a first rack gear 131 and a second rack gear 132, and a first receiving portion 133 and a second receiving portion 134 are formed. As shown in FIG. 10, when the throttle drive gear 101 is at the neutral position, first clearance L1 is defined between the first receiving portion 133 and the engagement portion 121. Also, second clearance L2 is defined between the second receiving portion 134 and the engagement portion 122.

When the control lever 11 is positioned in shift operation range S1 or S2, the throttle drive gear 101 is also positioned in shift operation range S1 or S2. When the control lever 11 makes a movement toward throttle operation range T1 (or T2) from shift operation range S1 (or S2), the engagement portions 121 and 122 move within the range of clearance L1 or L2. That is, during a period in which the control lever 11 moves to shift operation ranges S1 or S2, the slide member 102 is in the stopped state regardless of whether the throttle drive gear 101 is rotated.

Figure 11:
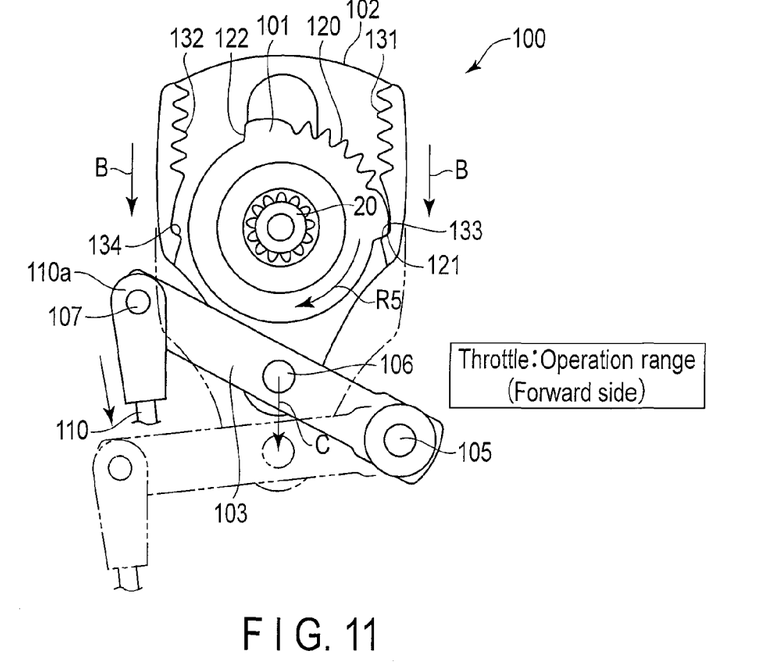
FIG. 11 is a front view of the throttle drive unit when the control lever is rotated to a forward throttle operation range.

As shown in FIG. 11, the control lever 11 and the throttle drive gear 101 are rotated by a predetermined amount in the first direction (the direction indicated by arrow R5), and reach the throttle operation range. Hence, as the first engagement portion 121 contacts the first receiving portion 133, the slide member 102 starts to move in the direction indicated by arrow B. When the throttle drive gear 101 is further rotated, the gear portion 120 of the throttle drive gear 101 meshes with the first rack gear 131. Consequently, the slide member 102 moves in the direction indicated by arrow C. In this way, the throttle arm 103 and the throttle cable 110 move to a position of changing the throttle opening.

Figure 12:
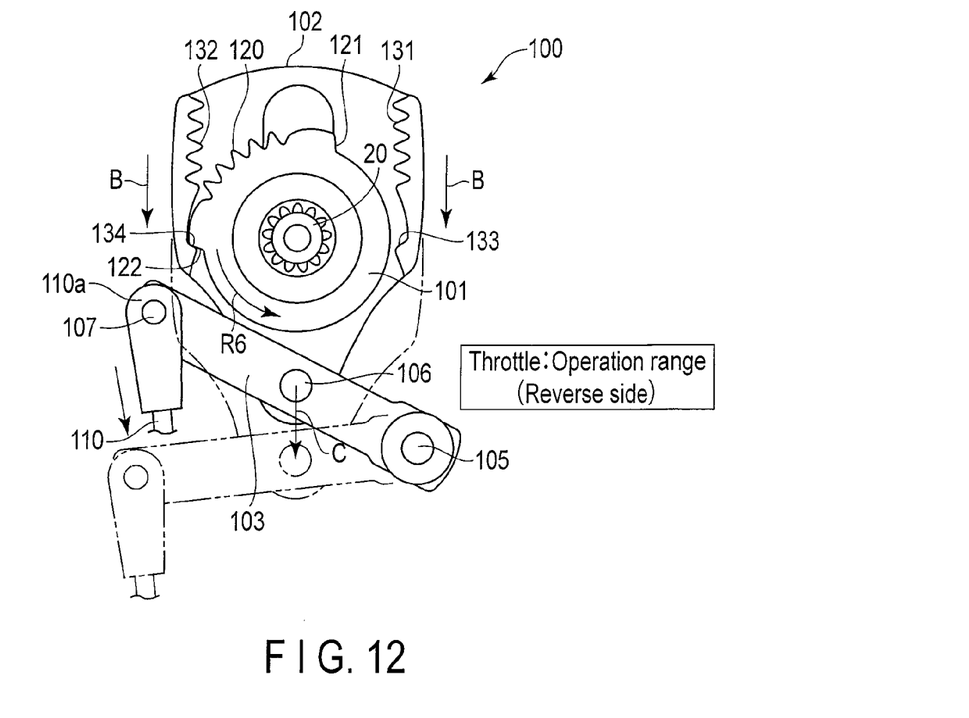
FIG. 12 is a front view of the throttle drive unit when the control lever is rotated to a reverse throttle operation range.

As shown in FIG. 12, the control lever 11 and the throttle drive gear 101 are rotated by a predetermined amount in the second direction (the direction indicated by arrow R6), and reach the throttle operation range. Hence, as the second engagement portion 122 contacts the second receiving portion 134, the slide member 102 starts to move in the direction indicated by arrow B. When the throttle drive gear 101 is further rotated, the gear portion 120 of the throttle drive gear 101 meshes with the second rack gear 132. Consequently, the slide member 102 moves in the direction indicated by arrow C. In this way, the throttle arm 103 and the throttle cable 110 move to the position of changing the throttle opening.

Figure 13:
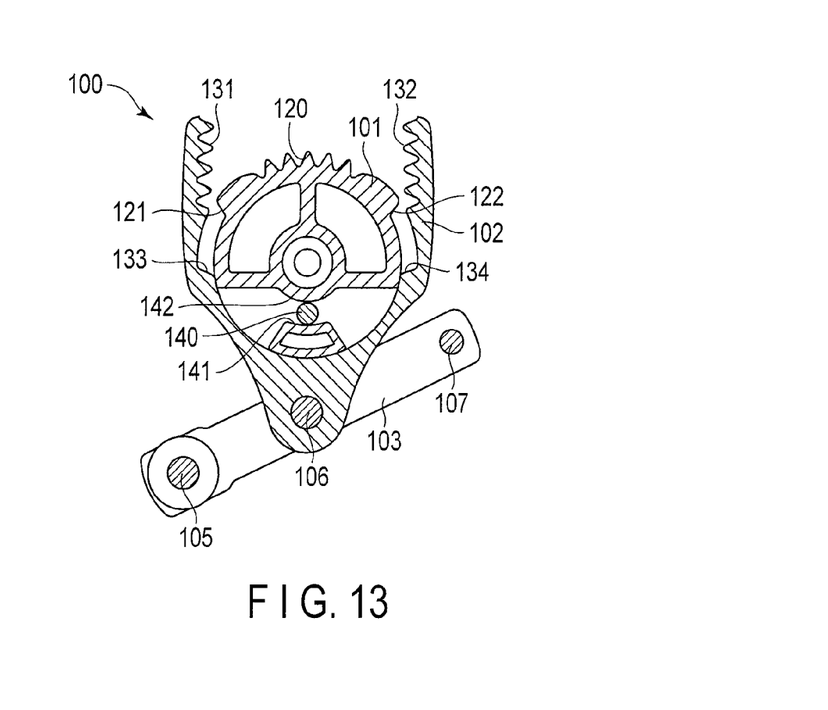
FIG. 13 is a cross-sectional view of the throttle drive unit shown in FIG. 10 as seen from the back.

As shown in FIG. 13, a stopper pin 140 is provided in the slide member 102. Also, supporting portions 141 and 142 are provided in the throttle drive gear 101. The stopper pin 140 and the supporting portions 141 and 142 are mutually engaged when the control lever 11 is in the initial position or the shift operation range. The stopper pin 140 prevents the slide member 102 from moving in a throttle operation direction (the direction indicated by arrow B) when the throttle drive gear 101 is in the initial position. When the throttle drive gear 101 is rotated by a predetermined amount in first direction R5 (FIG. 11) or second direction R6 (FIG. 12) from the initial position (FIG. 10), the supporting portion 141 is released from the stopper pin 140. In such a state, movement of the slide member 102 is permitted.

As shown in FIGS. 2 and 9, the throttle cable 110 is pressed from the side by a cable supporting member 150 provided in the housing 12. The cable supporting member 150 can be rotated about an axis 151. When the end portion 110a of the throttle cable 110 is to be connected to the connection portion 107 of the throttle arm 103, the cable supporting member 150 is moved to a retracted position as shown by two-dot chain lines in FIG. 2. In this retracted position, the end portion 110a is connected to the connection portion 107. After that, the cable supporting member 150 is moved to a position indicated by solid lines in FIG. 2.

In this way, it is possible to prevent the end portion 110a from slipping out of the connection portion 107 by way of the cable supporting member 150 without using a retaining member such as an E-ring. It is necessary to prevent the side cover 17 from being assembled by mistake while the cable supporting member 150 is in the retracted position. As the countermeasure for that, an erroneous assembly prevention portion, such as a convex portion, may be formed on the reverse side of the side cover 17 so that the side cover 17 is not completely closed when the cable supporting member 150 is in the retracted position.

An action of the engine control apparatus 10 of the present embodiment will be hereinafter described.

When the control lever 11 is at neutral position N, the drive shaft 20 and the shift drive gear 51 are also at the neutral position. Accordingly, as shown in FIG. 6, the gear portion 60 of the shift drive gear 51 and the gear portion 90 of the shift arm 52 mesh with each other. Accordingly, the shift arm 52 is maintained at the neutral position, and shift cable 54 is also maintained at the neutral position.

In neutral position N, the gear portion 120 of the throttle drive gear 101 does not mesh with the rack gears 131 and 132 of the slide member 102, as shown in FIG. 10. At this time, the stopper pin 140 (FIG. 13) is interposed between the supporting portions 141 and 142 of the throttle drive gear 101. Accordingly, it is possible to prevent the slide member 102 from moving.

When the control lever 11 is moved to forward shift operation range S1 from neutral position N, the shift drive gear 51 is rotated in the direction indicated by arrow R1, as shown in FIG. 7. In shift operation range S1, the gear portions 60 and 90 of the shift drive unit 50 mesh with each other. Thus, when the shift drive gear 51 is rotated in the direction of arrow R1, the shift arm 52 rotates in the direction of arrow R2. Accordingly, the position of the shift cable 54 is switched to the forward position.

After switching of shift to the forward position, the drive shaft 20 is further rotatively operated to the forward side by the control lever 11. Then, the throttle drive gear 101 is rotated in first direction R5 (FIG. 11) in accordance with the amount of rotation of the drive shaft 20. When the throttle drive gear 101 is rotated by a predetermined amount in first direction R5, the supporting portion 141 (FIG. 13) is released from the stopper pin 140. In such a case, the slide member 102 is movable in the direction indicated by arrow B. When the slide member 102 moves in the direction of arrow B, the throttle arm 103 and the throttle cable 110 move in the direction indicated by arrow C, thereby changing the throttle opening of the engine.

When the control lever 11 is moved to reverse shift operation range S2 from neutral position N, the shift drive gear 51 is rotated in the direction indicated by arrow R3, as shown in FIG. 8. In shift operation range S2, the gear portions 60 and 90 of the shift drive unit 50 mesh with each other. Thus, when the shift drive gear 51 is rotated in the direction of arrow R3, the shift arm 52 rotates in the direction of arrow R4, thereby switching the position of the shift cable 54 to the reverse position.

After switching of shift to the reverse position, when the drive shaft 20 is further rotatively operated to the reverse side by the control lever 11, the throttle drive gear 101 is rotated in second direction R6 (FIG. 12) in accordance with the amount of rotation of the drive shaft 20. When the throttle drive gear 101 is rotated by a predetermined amount in second direction R6, since the supporting portion 141 (FIG. 13) is released from the stopper pin 140, the slide member 102 is movable in the direction indicated by arrow B. When the slide member 102 moves in the direction of arrow B, the throttle arm 103 and the throttle cable 110 move in the direction indicated by arrow C, thereby changing the throttle opening of the engine.

For example, as in a warm-up operation, when only a throttle operation needs to be performed without performing a shift operation, the push operation portion 37 of the control lever 11 is pressed. By this pressing operation, the clutch pin 40 is moved to the second position, as shown in FIG. 5, and disengaged from the pin engagement portion 63 of the shift drive gear 51. Consequently, the shift drive gear 51 is detached from the drive shaft 20.

When the clutch pin 40 is moved to the second position (FIG. 5) by the above-mentioned pressing operation, the guide ring 46 is also moved to the second position together with the clutch pin 40. While the pressing operation is in effect, when the control lever 11 is pivotally moved to throttle operation range T1 (or T2) from neutral position N, the clutch pin 40 rotates along the guide ring 46 together with the drive shaft 20. Then, the throttle drive gear 101 is rotated in the direction indicated in FIG. 11 or 12 together with the drive shaft 20. Since the throttle arm 103 is moved by the rotation, it is possible to control the throttle opening.

As described above, when the clutch pin 40 is moved to the second position, the protrusion 47 of the guide ring 46 engages with both of the gear case 45 and the shift drive gear 51, as shown in FIG. 5. Accordingly, the shift drive gear 51 is secured to the housing 12 via the gear case 45. Therefore, during the warm-up operation in which a shift operation is prohibited, in pivoting the control lever 11 for a throttle operation, it is possible to prevent the shift drive gear 51 from rotating together with the drive shaft 20. That is, it is possible to prevent the shift operation from being conducted by mistake.

When the warm-up operation or the like is terminated and the control lever 11 is returned to neutral position N, the clutch pin 40 returns to the first position indicated in FIG. 3 by the return spring 36. Therefore, the clutch pin 40 enters into the pin engagement portion 63 of the shift drive gear 51. Accordingly, the drive shaft 20 and the shift drive gear 51 are returned to the state in which they are coupled to each other.

In implementing the present invention, it is needless to say that the shape, structure, arrangement, and the like of each member which constitutes the housing, drive shaft, shift drive unit, throttle drive unit, etc., of the engine control apparatus may be modified variously. Also, as the spring member of the friction mechanism, an elastic body other than the disc spring unit may be used. Further, the engine control apparatus of the present invention can be used for remotely operating an engine directed to controlling two types of operations apart from the shift and throttle by way of a single control lever.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An engine control apparatus comprising:
    a housing;
    a drive shaft provided rotatably in the housing;
    a control lever mounted on the drive shaft, and configured to be pivoted over a forward shift operation range, a forward throttle operation range, a reverse shift operation range, and a reverse throttle operation range with a neutral position in between forward and reverse;
    a shift drive unit configured to move a shift cable to a forward position when the control lever is moved to the forward shift operation range from the neutral position, and to move the shift cable to a reverse position when the control lever is moved to the reverse shift operation range from the neutral position;
    a throttle drive unit configured to transmit pivoting of the control lever to a throttle cable in a state where the control lever is moved to one of the forward throttle operation range and the reverse throttle operation range; and
    a friction mechanism configured to apply friction to the pivoting of the control lever in a state where the control lever is moved to one of the forward throttle operation range and the reverse throttle operation range,
    the shift drive unit comprising:
    a shift drive gear including a driving side gear portion which rotates together with the drive shaft; and
    a shift arm including a driven side gear portion which transmits pivoting of the shift drive gear by meshing with the driving side gear portion when the control lever is in one of the forward shift operation range and the reverse shift operation range, the shift arm being in a stopped state when the control lever pivots in either of the throttle operation ranges,
    the throttle drive unit comprising:
    a throttle drive gear configured to rotate in a first direction and a second direction from an initial position;
    a slide member comprising a first rack gear which meshes with the throttle drive gear when the control lever is in the forward throttle operation range, and a second rack gear which meshes with the throttle drive gear when the control lever is in the reverse throttle operation range, and configured to move by the pivoting of the throttle drive gear; and
    a throttle arm connected to the slide member.

2. The apparatus of claim 1, wherein the friction mechanism comprises:
    a brake portion provided in the shift drive gear and configured to rotate together with the shift drive gear;
    a brake shoe arranged to be opposed to the brake portion;
    a spring member which urges the brake shoe toward the brake portion; and
    supporting means for supporting the brake shoe when the control lever is in one of the forward shift operation range and the reverse shift operation range, and
    the brake portion comprises:
    a non-friction surface which is separated from the brake shoe while the brake shoe is being supported by the supporting means when the control lever is moved to one the forward shift operation range and the reverse shift operation range from the neutral position; and
    a friction surface which contacts the brake shoe in a state where the control lever is pivoted to one of the forward throttle operation range and the reverse throttle operation range.

3. The apparatus of claim 2, wherein the spring member comprises a disc spring unit formed by stacking a plurality of disc springs so that they are arranged in series.

4. The apparatus of claim 3, further comprising an adjuster screw configured to adjust an amount of deflection of the disc spring unit.

5. The apparatus of claim 1, wherein the throttle drive unit comprises a stopper pin provided in the slide member, and supporting portions which prevent movement of the slide member by engaging with the stopper pin when the control lever is moved to one of the forward shift operation range and the reverse shift operation range from the neutral position, and allow movement of the slide member as they are released from the stopper pin in a state where the throttle drive gear is rotated by a predetermined amount in one of the first direction and the second direction from the initial position.

* * * * *